May 11, 1954 — O. MINDER — 2,678,033
INTERNAL-COMBUSTION ENGINE EXHAUST CONTROL SYSTEM
Filed Jan. 25, 1952 — 4 Sheets-Sheet 1
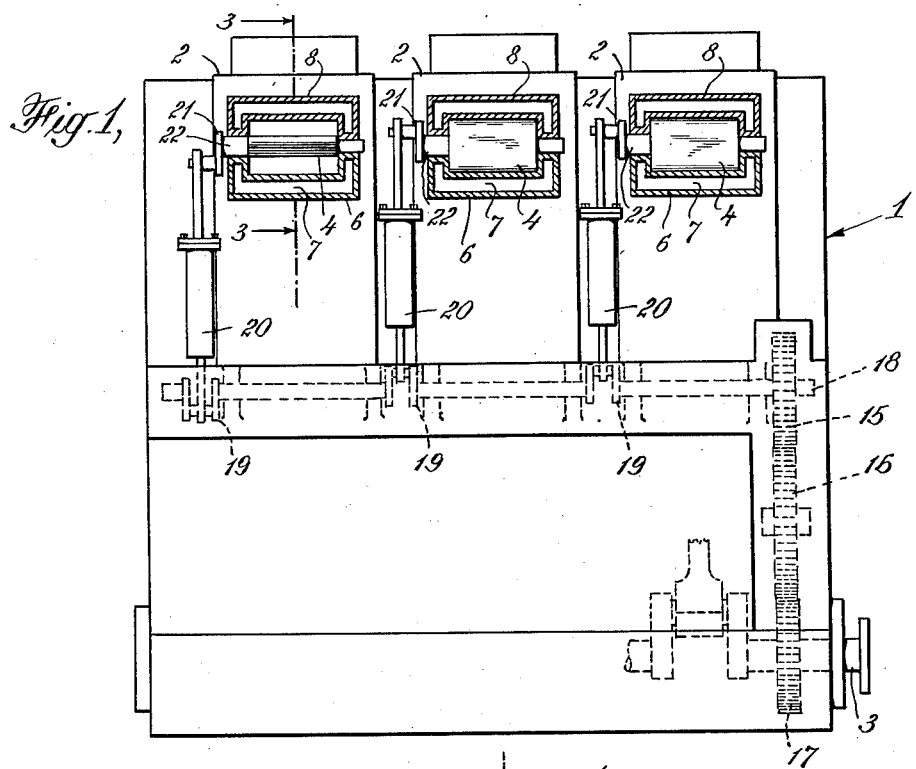
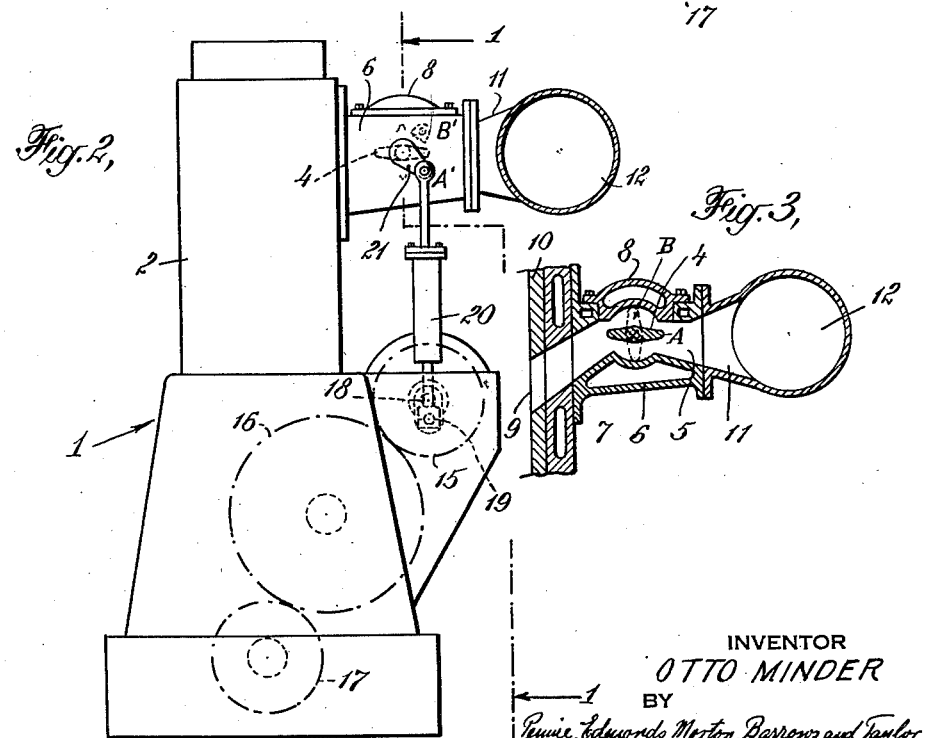
INVENTOR
OTTO MINDER
BY
Pennie, Edwards, Morton, Barrows and Taylor
ATTORNEYS

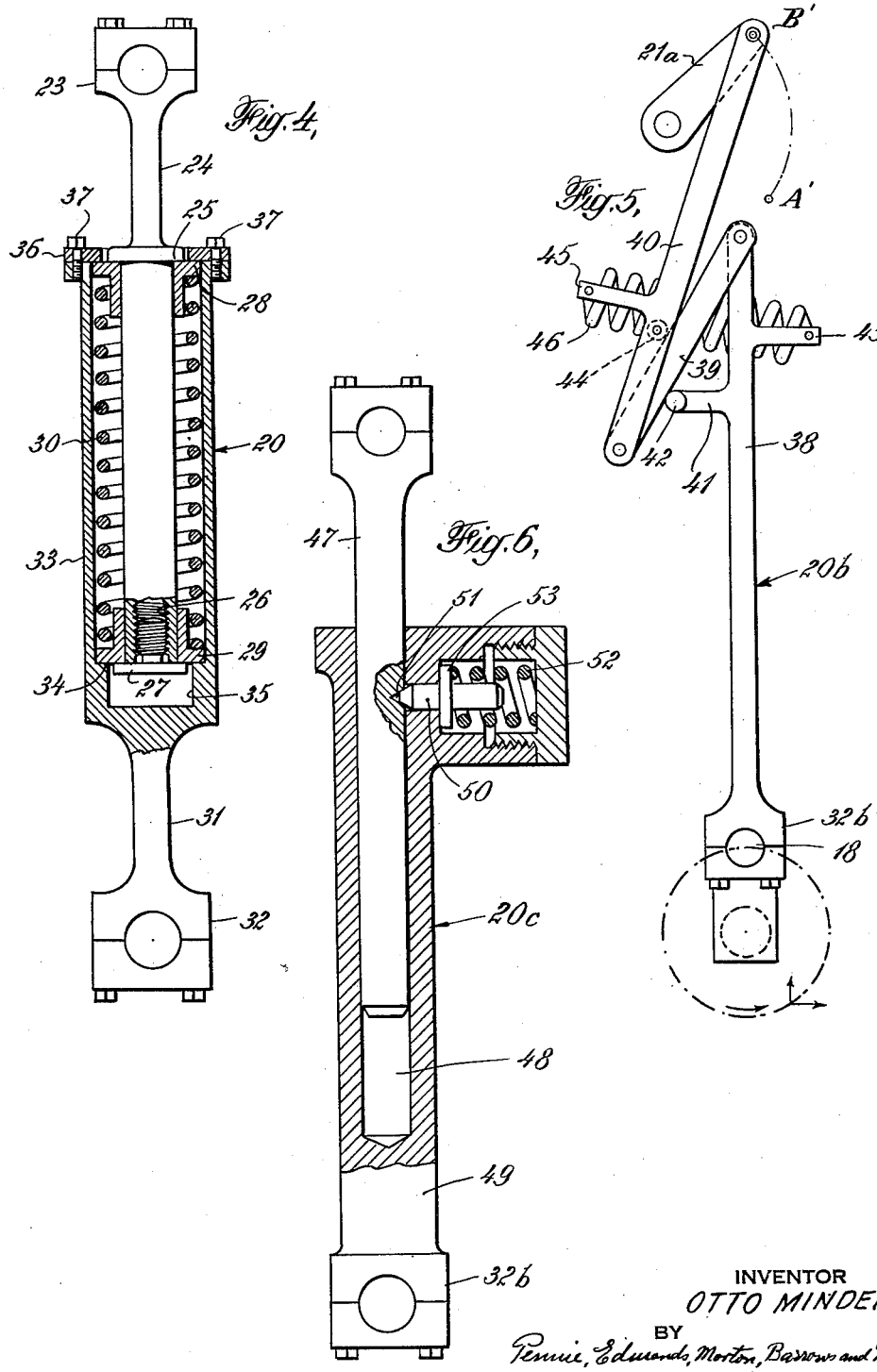

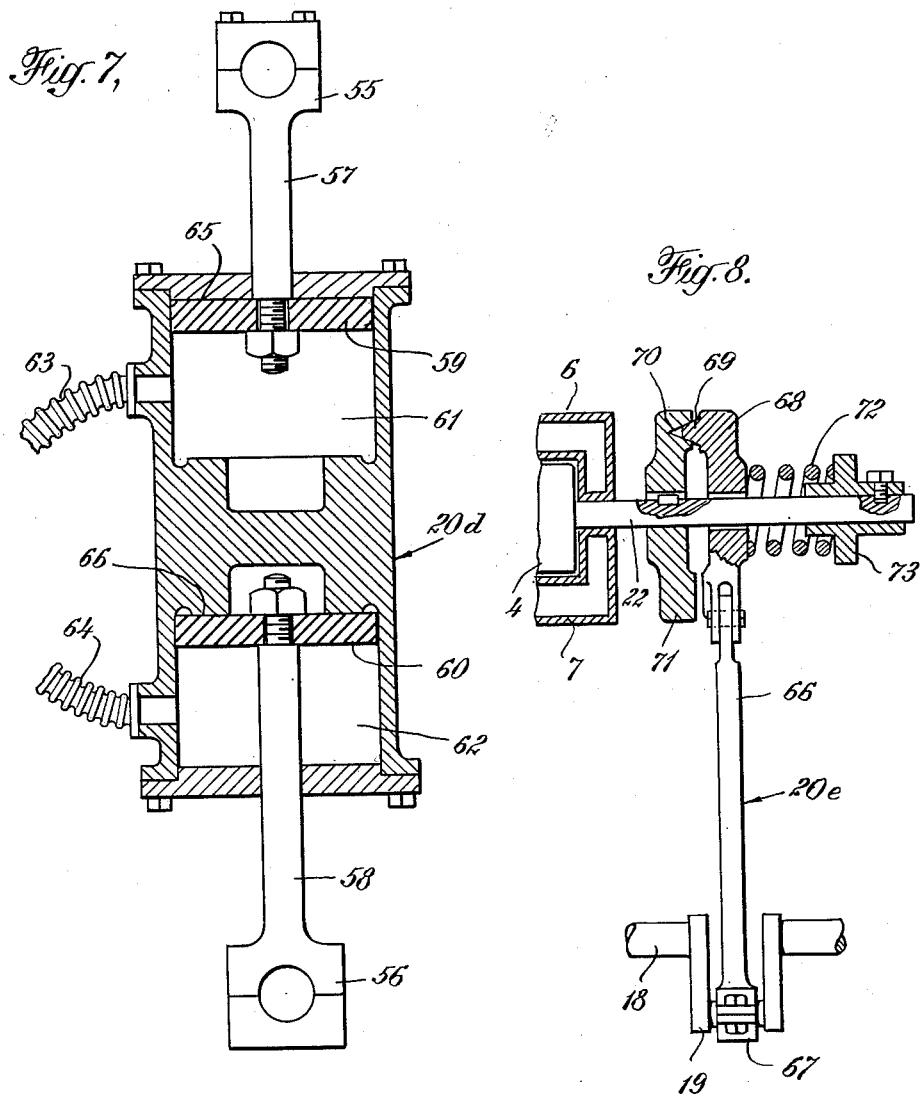

May 11, 1954            O. MINDER           2,678,033
INTERNAL-COMBUSTION ENGINE EXHAUST CONTROL SYSTEM
Filed Jan. 25, 1952           4 Sheets-Sheet 4
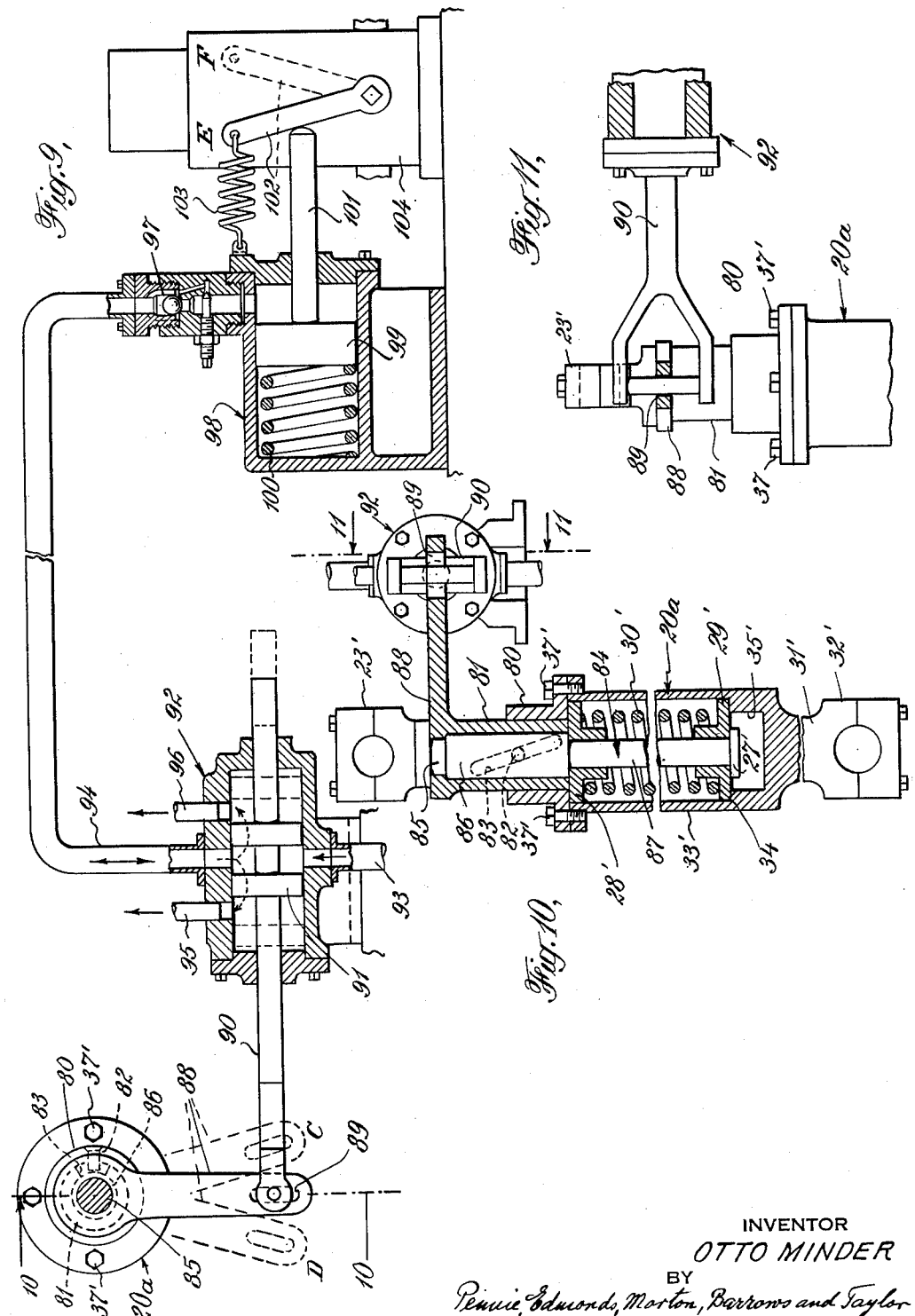
INVENTOR
*OTTO MINDER*
BY
*Pennie, Edmonds, Morton, Barrows and Taylor*
ATTORNEYS Patented May 11, 1954

2,678,033

UNITED STATES PATENT OFFICE 2,678,033

INTERNAL-COMBUSTION ENGINE EXHAUST CONTROL SYSTEM

Otto Minder, Winterthur, Switzerland, assignor to Sulzer Frères, Societe Anonyme, Winterthur, Switzerland Application January 25, 1952, Serial No. 268,166

Claims priority, application Switzerland January 31, 1951

9 Claims. (Cl. 123—59)

1

This invention relates to multi-cylinder internal combustion engines and more particularly to protective means for actuating the exhaust control elements of multi-cylinder internal combustion engines, and for interrupting the fuel supply of inoperative cylinders of such engines.

The usual devices for controlling the exhaust of internal combustion engines are oscillating elements such as poppet valves or "butterfly" valves linked by connecting elements or rods to a common control shaft, either a crank or cam shaft, driven in timed relation to the speed of the main crankshaft of the engine. In mechanisms of this type there is the danger of seizing or jamming of the control elements or their connecting elements due to heat expansion or the interference of foreign matter. A stoppage of this kind generally has the serious consequence of breaking the exhaust control element, the control shaft, or its driving mechanism which results in a breakdown of the whole engine.

The invention overcomes this difficulty and restricts the scope of the damage by providing novel yielding connecting elements between the driving control shaft and the exhaust control elements. In normal operation the connecting elements of the invention act as conventional, substantially rigid linkages of constant length, but in the event that an abnormal resistance to the oscillating movement of an exhaust control element is met, the connecting element of the invention yields longitudinally and alternately shortens and lengthens under the forces applied by the control shafts.

A feature of the invention is that this yielding of the connecting element may continue without undue stress on related components of the engine until the obstruction is spontaneously relieved or until it is convenient to discontinue operation of the engine.

To prevent an accumulation of fuel within the cylinder with which an inoperative exhaust control element is associated, the invention further provides that the connecting elements of the exhaust control elements are connected to control devices for interrupting the supply of fuel to such a cylinder. The control devices may be adapted to manual or automatic restoration of the flow of fuel upon removal of the obstruction of the exhaust control element.

Specific embodiments of the invention are fully disclosed in the following description and the attached drawings illustrate the description.

2

In these drawings:

Fig. 1 is a side elevation of a multi-cylinder internal combustion engine partly in section.

Fig. 2 is a front view of the internal combustion engine of Fig. 1.

Fig. 3 is a partial view in section of the front of the engine of Fig. 2.

Fig. 4 is a detailed view partly in section of the yielding connecting element of the invention.

Figs. 5, 6, 7, and 8 are other embodiments of the yielding connecting elements of the invention.

Fig. 9 is a sectional plan view of the yielding connecting element of the invention in combination with the fuel supply interruption system of the invention.

Fig. 10 is an end view in section of the yielding connecting element and fuel supply interruption system of Fig. 9.

Fig. 11 is a partial side view in section of the yielding connecting element and fuel supply interruption system of Figs. 9 and 10.

With reference to Figs. 1, 2 and 3, the engine 1, which for purposes of this description is a two stroke cycle scavenging engine, comprises a plurality of substantially identical cylinders 2 and pistons (not shown) cooperatively connected to a common crankshaft 3. Each of these cylinders is provided with an exhaust control element, in the particular embodiment a butterfly valve 4, within an exhaust gas conduit 5 of double walled pipe 6. Conduit 5 opens at one end to exhaust port 9 in cylinder wall 10, and at the other end is connected to a lateral pipe 11 of exhaust manifold 12 common to all cylinders. Cooling fluid is circulated in interstices 7 of pipes 6, and covers 8 in the pipes facilitate cleaning of the valves and conduits.

The butterfly valve 4 of any cylinder 2 is driven with an oscillating motion in timed relation to the speed of the engine, alternately opening and closing the conduit 5 to the passage of exhaust gases from the cylinder. A timed driving force is obtained through a train of gears 15, 16, and 17 interconnecting the main crankshaft 3 with valve control shaft 18, a rotating crankshaft. Eccentric throws 19 of control shaft 18 are linked by the yielding connecting elements 20 to toggle arms 21 on butterfly valve shafts 22. Since the eccentricity of the throw of control shaft 18 is less than half the length of toggle arm 21, the pure rotary motion of the control shaft 18 is translated into an oscillating motion of the toggle arms 21 and, therefore, of butterfly valves 4.

It is clear that an obstruction of the free oscillation of the valves 4 by foreign matter or seizing of the bearings of shaft 22 due to heat expansion will induce an abnormally high force resisting the driving gears and shafts with resulting damage to them or to the valve 4 or shaft 21 if conventional inflexible connecting elements are employed. According to the invention a novel connecting element 20 is provided which will maintain a constant length under normal driving forces but will yield longitudinally under excessive resisting forces applied at its upper end.

With reference to Fig. 4 the yielding connecting element 20 has an upper head 23 on rod 24, the latter having a collar 25 intermediate its length, and a threaded socket 26 in its lower end to receive a capped plug 27. Slidably fitted around rod 24 are flanged collars 29 and 28 which bear against the cap of plug 27 and collar 25 respectively. Compression spring 30 substantially coaxial of the rod 24 bears against flanged collars 28 and 29 and exerts a force which tends to separate them. Rod 31 has a head 32 at its lower end and a hollow cylindrical extension 33 of substantially larger diameter. This hollow extension 33 receives the components assembled on rod 24 and has an internal shoulder 34 at a depth equal to the length of the rod 24 from its collar 25 to its plugged end supporting flanged collar 29. Below shoulder 34 is a well 35 to receive the plugged end of rod 24 when compressive forces great enough to cause further compression of spring 30 are applied. An annular retaining ring 36 having an inner diameter smaller than the internal diameter of the hollow extension 33 is mounted coaxially of the extension at its open end by bolts 37. The inner face of this ring serves as a bearing for flanged collar 28 when tensile forces are applied at the heads 23 and 32 of the connecting element.

In operation the connecting element 20 is coupled at one end to an eccentric throw 19 of control shaft 18 and to a toggle arm 21 of an exhaust control element at the other end. Normally, the control shaft 18 exerts alternating tensile and compressive forces on the connecting element 20 which alternately raise and lower the toggle arm 21. The modulus of spring 30 and its initial constriction are chosen to pre-load the spring so that the force necessary to compress it further, thus altering the length of the connecting element, is greater than the forces normally encountered in the actuation of the butterfly valve 4. Then, should the valve 4 become obstructed by foreign matter or the shaft 22 become seized in its bearings, the force necessary to free or break the valve and shaft will be greater than the force necessary to compress the spring and the connecting element begins to lengthen under tensile forces and shorten under compressive forces. This will continue until the engine is stopped or the obstruction or seizing is spontaneously removed and the resistive forces again become less than the force required to compress the spring.

In addition to the yielding connecting element to provide the protection afforded thereby, the invention provides a means for interrupting the supply of fuel to a cylinder rendered inoperative by an obstruction of its exhaust control element. With reference to Figs. 9, 10, and 11 a modification of the connecting element of Fig. 4 is shown in conjunction with a fuel interruption system.

The modified form of the connecting element 20a of Fig. 10 is similar to the connecting element of Fig. 4 except that headed rod 24 is replaced by headed rod 84 which has three coaxial sections 85, 86 and 87 of its length having different diameters. Section 85 is relatively short and has head 23' fixed to one end. The other end joins to section 86 which in turn joins with section 87. The latter has a threaded socket (not shown) to receive capped plug 27' as in the embodiment of Fig. 4.

In lieu of the annular retaining ring 36 of Fig. 4 there is provided a flanged sleeve 80 which is held in place by bolts 37' and serves to retain rod 24', the flanged collars 28' and 29', and spring 30 assembled on the rod, within the hollow extension 33' of rod 31'. Slidably fitted around sections 85 and 86 of rod 84 and within flanged sleeve 80 is a sleeve 81 having a toggle arm projecting laterally of sleeve 81 at its upper end. Projecting inwardly of the wall of sleeve 80 is a cam screw 82 which engages a short section of a helical cam groove 83 cut into the wall of sleeve 81.

In operation the connecting element 20a responds to normal and excessive actuating forces in substantially the same manner as the embodiment of Fig. 4. In addition, however, when an excessive tensile force is applied which causes the spring 30' to compress and allow the rod 84 to be withdrawn from the hollow extension 33', rod 84 and sleeve 81 move axially of the connecting element with reference to sleeve 80. This causes cam pin 82 engaged in cam groove 83 to rotate the sleeve 81 about the rod 84 in the counterclockwise direction as seen in Fig. 9, which shifts toggle arm 88 to position C. A similar reaction shifting toggle arm 88 to position D is had if the excessive activating force causes the rod 84 and sleeve 81 to be advanced within the hollow extension 33'. Thus, in the course of one cycle of the control shaft while the exhaust control element is obstructed, the toggle arm 88 oscillates within the range C—D of Fig. 9.

In the specific embodiments of Figs. 9, 10, and 11, this oscillating motion of the toggle arm is utilized to actuate a fuel interruption system. Toggle arm 88 has a longitudinal slot 89 with which the piston rod 90 engages. As long as the resistance of the exhaust control element to its actuating forces is normal, the connecting element 20a moves without any alteration in its length, and, due to the loose connection of rod 90 in the longitudinal slot 89, toggle arm 88 follows the motion of connecting element 20a without displacing the piston rod 90. This maintains the pistons 91 of control valve 92 in the neutral position illustrated.

A pressure medium such as oil for example, traverses the valve 92, entering at pipe 93 from a pressure source not shown and leaving through pipe 94 and valve 97 and passing to servomotor 98. The pressure medium drives piston 99 against spring 100 and displaces rod 101 to the left allowing tension spring 103 to move cutoff lever 102 to position E corresponding to full normal delivery of fuel pump 104, and fuel is delivered to the particular cylinder of the engine with which connecting element 20a is associated.

If, however, the resistance of the exhaust control element is excessive and the toggle arm 88 is caused to oscillate in response to cyclic alterations of the length of the connecting element 20a, the piston rod 90 and pistons 91 of valve 92 oscillate in a corresponding degree so that the pressure medium can flow off from servomotor 98 through valve 97, pipe 94, and vents 95 and 96 to a reservoir not shown. Compression spring 100 displaces piston 99 and rod 101 to the right upon relief of the pressure exerted by the pressure medium and rod 101 moves cutoff lever 102 to position F corresponding to cutoff of delivery of fuel to the cylinder with which connecting element 20a is associated.

Inasmuch as pistons 91 are caused to oscillate when the connecting element 20a is responding to excessive resistive forces of the exhaust control element, they pass through their normal positions at least once during every cycle of the control shaft which will, without more, permit the pressure medium to actuate the servomotor 98 and intermittently return the cutoff lever 102 to its full delivery position E. To circumvent this undesirable condition the servomotor 98 is provided with valve 97 which permits a rapid outflow of the pressure medium from servomotor 98 but restricts the inflow to a low rate. Therefore, in the short interval during which the pistons 91 are passing through their normal positions while oscillating, only a small amount of pressure medium passes valve 97 and piston 99 is displaced by a negligible amount. As a consequence, cutoff lever 102 is not displaced from the cutoff position and no fuel is delivered to the engine.

By the means above described an internal combustion engine provided with the connecting element and fuel supply interruption system of the invention is completely protected against excessive forces created by an obstruction, seizing, or jamming of its exhaust control elements, and against fuel flooding of inoperative cylinders, and against waste of fuel.

With reference to Figure 5, another embodiment of the connecting element of the invention comprises link 38 connected by head 32b to control shaft 18 and pin-hinged at its upper end to link 39 which is in turn pin-hinged to link 40. The upper end of link 40 is pin-hinged to toggle arm 21a which actuates the exhaust control element of the engine as in the preferred embodiment. Projecting laterally from link 38 are cam arm 41 provided with pin 42 and spring post 43. Projecting laterally from link 40 are cam pin 44 and spring post 45. Tension spring 46 is connected between the unsupported ends of spring posts 43 and 45 and tends to constrain the links 38, 39, and 40 in a rigid relation substantially as shown in Fig. 5, i. e. link 39 is held against pin 42 and link 40 is held against pin 44.

The configuration of Fig. 5 is adapted to operation in conjunction with a control shaft which rotates head 32b in the counter-clockwise direction. The modulus of spring 46 and its elongation while the links are in the constrained position are chosen to pre-load spring 46 to present a force great enough to oppose the tendency of normal operating forces of the exhaust control element to toggle or spread the links. However, should the exhaust control element present a greater than normal resistance to actuation, thereby tending to constrain the upper end of link 40 to position B', the downward and leftward travel of head 32b rotates the link 38 about pin 42 with a force great enough to elongate spring 46 and allow links 38, 39, and 40 to rotate with reference to each other and effectively lengthens connecting element 20b to permit head 32b to traverse its normal path while toggle arm 21 remains stationary at position B'. It is seen that a similar toggle action of the connecting element 20b is had if the toggle arm should present a greater than normal resistive force at A', in which case the mechanism will permit the connecting element to shorten. And, in the event that exhaust control element 4 presents greater than normal resistive forces at some point intermediate of A' and B', the connecting element will alternately lengthen and shorten while head 32b follows its normal circular course without interruption or undue stress on cooperating elements.

Fig. 6 shows yet another embodiment 20c of the connecting element of the invention. Rod 47, headed at its upper end for operative connection with the toggle arm of the exhaust control element is received in the well 48 of hollow rod 49 headed at its lower end for operative connection to the throw of the control shaft. The bevelled end of detent pin 50 is held in a conical recess 51 in the rod 48 by compression spring 52 bearing against a collar 53 on pin 50. The modulus and initial compression of spring 52 are chosen to resist dislocation of pin 50 by components of normal actuating forces encountered by connecting element 20c in driving an exhaust control element. The lateral forces on detent pin 50 accompanying excessive tensile forces in the connecting element 20c are, however, great enough to move the pin against the spring and out of the recess 51. This permits the rod 48 to slide in the well of rod 49 and alternately lengthen and shorten the effective length of the connecting element as in the embodiment of Fig. 4.

A similar yielding under excessive tensile or compressive forces is obtained with the connecting element 20d of Fig. 7. The heads 55 and 56 on rods 57 and 58 are operatively connected to the toggle arm 21 of an exhaust control element and a throw 19 of the control shaft respectively. Opposite the headed ends of rods 57 and 58 are pistons 59 and 60 within cylinders 61 and 62 respectively. Flexible tubes 63 and 64 connect the cylinders 61 and 62 with a pressure medium reservoir not shown. The pressure medium, which may be air, water, or oil for example, has an initial pressure sufficient to resist movement of the pistons 59 and 60 within their cylinders under normal tensile or compressive forces encountered by the connecting element 20d. Excessive forces, however, cause the pistons to exert pressure greater than that of the pressure medium and move away from their normal positions against stops 65 and 66, e. g. under an excessive compressive force piston 59 will advance within its cylinder and shorten the connecting element while a tensile force will cause piston 60 to withdraw from its cylinder and lengthen the connecting element. This provides the same safeguards as the connecting element 20 of the embodiment of Fig. 4.

Fig. 8 shows a yielding connecting element 20e of the rotary detent type. In this embodiment rod 66 is operatively connected to throw 19 of control shaft 18 by head 67. The opposite end of rod 66 is pin-hinged to a collar 68 slidably mounted on the shaft 22 of the exhaust control element 4. A truncated cone-shaped projection 69 on collar 68 engages a similarly shaped recess 70 in a collar 71 keyed to the shaft 22 of the exhaust control element. A compression spring 72, constrained between collar 68 and fixed collar 73, holds the projection 69 in engagement with the recess 70 under normal forces actuating the exhaust control element. Should these forces become excessive according to the predetermined characteristics of the spring 72, the forces on the projection 69 drive the collar 68 along the shaft and against the spring until the tip of the projection can slide freely over the annular face of collar 71 while collar 71 and, therefore, the exhaust control element, remain stationary. At least once during every cycle of the control shaft 18 the projection 69 will re-engage the recess 70. If forces normal to the actuation of the exhaust control element are encountered, it will remain engaged; if excessive forces continue to be encountered, the projection 69 will again disengage as hereinbefore described, thus providing protection against damage to the exhaust control element or the control shaft.

It will be apparent to one skilled in the art that other embodiments of the yielding connecting element of the invention are equally feasible. It will also be apparent that the invention includes within its spirit and scope yielding connecting elements which are adapted to cooperate with exhaust control elements such as poppet valves, for instance, and with control shafts such as cam shafts, for example. In the latter case, it will usually be necessary to construct the connecting elements to yield under the action of excessive compressive forces only. This is true in view of the fact that a cam actuated valve system depends on cam surfaces to open the valves in timed relation to the speed of the engine while independent springs are utilized to return them to the closed position. Therefore, it is only under the inflexible unidirectional action of the cam shaft that the yielding connecting element of the invention is required to provide protection to the associated elements of the exhaust control system.

It will also be apparent to one skilled in the art that the fuel supply interruption system of the invention may be adapted to cooperate with other embodiments of the connecting element of the invention. Generally, this may be accomplished by utilizing the characteristic relative motion of two components of the connecting element to actuate a fuel supply interruption system to its cutoff position when the connecting element is altering its length.

It will be noted that the action of the detent pin 50 (see Fig. 6) or the projection 69 (see Fig. 8) will provide sufficient audible signal to give warning of an obstruction to an exhaust control element. However, these embodiments as well as those of Figs. 4, 5, and 7 may be provided with audible or visual warning systems, too.

Having fully disclosed a preferred embodiment of my invention and several alternative embodiments, I claim:

1. In a multi-cylinder internal combustion engine, an exhaust control system provided for each cylinder comprising a reciprocating exhaust control element, a rotating control shaft driven in timed relation to the speed of the engine, and a connecting element between said control element and said control shaft constructed and arranged to comply in non-linear relation to the actuating forces applied to the exhaust control element by the control shaft, said connecting element being non-compressible within the normal range of actuating forces and compressible under forces which exceed normal actuating forces.

2. A multi-cylinder internal combustion engine exhaust control system comprising a control shaft driven in timed relation to the speed of the engine, an oscillating exhaust control element for each of a plurality of cylinders, and a resilient connecting element operatively connecting each of said exhaust control elements to said control shaft, said resilient connecting elements being sufficiently inflexible to transmit normal actuating forces from the control shaft to the exhaust control elements without alteration of their lengths, said resilient connecting elements being sufficiently flexible to alter their lengths under excessive resistive forces of the exhaust control elements.

3. In a multi-cylinder internal combustion engine having an oscillating exhaust control element on each cylinder and a control shaft driven in timed relation to the speed of the engine, yielding connecting elements operatively linking each of said exhaust control elements to said control shaft or shafts, said yielding connecting elements being sufficiently inflexible to transmit normal actuating forces to said exhaust control elements, said yielding connecting elements being sufficiently flexible to alter their lengths under excessive resistive forces of the exhaust control elements.

4. A yielding connecting element according to claim 3, said yielding connecting element comprising a first headed rod, a fixed collar intermediate the ends of said rod, a first annular collar slidably mounted on the rod to bear against said fixed collar, a second annular collar slidably mounted on said rod, a compression spring coaxial of said first rod and contained between said first and second annular collars, a capped threaded plug received in a threaded socket in the unheaded end of said first rod to constrain the spring and the first and second annular collars to the length of said first rod between the fixed collar and the unheaded end of said first rod, a second rod having a head at one end and a hollow cylindrical extension on its opposite end, said hollow extension being of sufficient internal dimensions to receive said first rod and the first and second annular collars and spring assembled on said first rod, internal of the hollow extension an annular shoulder against which bears said second annular collar, a well extending below the depth of the shoulder within said hollow extension, an annular ring concentric of the open end of said hollow extension and a plurality of bolts to constrain said first rod and the spring and first and second annular collars assembled thereon within said hollow extension.

5. A yielding connecting element according to claim 3, said yielding connecting element comprising a first headed link, a pin hinge rotatably connecting the unheaded end of said first link to one end of a second link, a pin hinge rotatably connecting the opposite end of said second link to one end of a third link, a pin hinge at the opposite end of said third link, a cam arm extending laterally of the first link to intercept said first link intermediate its ends, a first spring arm extending laterally of said first link, a cam arm extending laterally of said third link to intercept said second link intermediate its ends, a second spring arm extending laterally of said third link, and a tension spring connected between the unsupported extremes of said first and second spring arms.

6. A yielding connecting element according to claim 3, said yielding connecting element comprising a headed rod having a lateral conical depression intermediate its ends, a headed tube to receive the unheaded end of said rod, a bevelled detent pin passing through an aperture in the wall of the tube to engage the conical depression in the rod, an annular collar on said detent pin, a spring retaining means lateral of the tube, and a compression spring therein bearing against the annular collar on said detent pin to constrain the detent pin to engagement with said depression under normal actuating and resistive forces applied at the headed ends of said rod and tube respectively.

7. A yielding connecting element according to claim 3, said yielding connecting element comprising a first rod headed at one end, a first piston fixed to the unheaded end of said first rod, a second rod headed at one end, a second piston fixed to the unheaded end of said second rod, a cylinder casing having cylinders in its opposite ends to receive said first and second pistons respectively, cover plates annular of said first and second rods and fixed over the open ends of said cylinders, and flexible tubes connecting each of said cylinders to a common pressure medium reservoir.

8. A yielding connecting element according to claim 3, said yielding connecting element comprising an actuating shaft of said exhaust control element, a first annular collar on said shaft, a key fixing said collar to the shaft, a second annular collar slidably mounted on the shaft, a conical depression in one face of said first annular collar, a conical projection on one face of said second annular collar engaging said depression, a rod having a head at one end and a pin hinge at the other end, said pin hinge operatively connecting the rod and the second annular collar, a spring retaining collar fixed to the exhaust control element shaft, and a compression spring substantially coaxial of said shaft and constrained between the said second collar and the spring retaining collar to maintain the projection and depression in engagement under normal actuating forces applied at the headed end of the rod.

9. In a multi-cylinder internal combustion engine having an oscillating exhaust control element on each cylinder and a control shaft driven in timed relation to the speed of the engine, yielding connecting elements operatively linking each of said exhaust control elements to said control shaft, and fuel supply interruption means on each cylinder operatively connected to the yielding connecting element associated therewith to interruptively respond to the yielding characteristic of the connecting elements under excessive resistive forces of the exhaust control elements.

References Cited in the file of this patent

UNITED STATES PATENTS

| Number | Name | Date |
| --- | --- | --- |
| 1,317,788 | Hinsdale | Oct. 7, 1919 |
| 1,318,781 | McKechnie | Oct. 14, 1919 |
| 1,320,062 | Junkers | Oct. 28, 1919 |
| 1,539,769 | Poillon, Jr. | May 26, 1925 |
| 2,005,089 | Krebs | June 18, 1935 |
| 2,165,239 | Douglas et al. | July 11, 1939 |
| 2,403,844 | Bolli | July 9, 1946 |
| 2,552,006 | Gill | May 8, 1951 |

FOREIGN PATENTS

| Number | Country | Date |
| --- | --- | --- |
| 55,574 | Austria | Sept. 25, 1912 |